(12) United States Patent
Mahoney

(10) Patent No.: US 8,224,732 B1
(45) Date of Patent: Jul. 17, 2012

(54) FIDUCIARY SCREENER TEST AND BENEFIT PLAN SELECTION PROCESS

(76) Inventor: Dennis F. Mahoney, West Chester, PA (US)

( * ) Notice: Subject to any disclaimer, the term of this patent is extended or adjusted under 35 U.S.C. 154(b) by 938 days.

(21) Appl. No.: 12/079,119

(22) Filed: Mar. 25, 2008

(51) Int. Cl.
*G06Q 40/00* (2012.01)
(52) U.S. Cl. ............................ 705/36 R; 705/35; 705/37
(58) Field of Classification Search .................. 705/35, 705/36 R, 37
See application file for complete search history.

(56) References Cited

U.S. PATENT DOCUMENTS

| | | | | |
|---|---|---|---|---|
| 5,918,217 | A * | 6/1999 | Maggioncalda et al. ... | 705/36 R |
| 6,014,642 | A * | 1/2000 | El-Kadi et al. .............. | 705/36 R |
| 6,041,313 | A * | 3/2000 | Gilbert et al. ............... | 705/36 R |
| 6,078,904 | A * | 6/2000 | Rebane ........................ | 705/36 R |
| 6,565,359 | B2 * | 5/2003 | Calhoun et al. .............. | 434/236 |
| 6,629,846 | B2 * | 10/2003 | Poreh ........................... | 434/236 |
| 6,632,174 | B1 * | 10/2003 | Breznitz ....................... | 600/300 |
| 6,705,870 | B2 * | 3/2004 | Penno .......................... | 434/258 |
| 6,859,788 | B1 * | 2/2005 | Davey ......................... | 705/36 R |
| 6,925,601 | B2 * | 8/2005 | Moore et al. ................. | 715/707 |
| 6,944,596 | B1 * | 9/2005 | Gray et al. ................... | 705/321 |
| 6,996,539 | B1 * | 2/2006 | Wallman ....................... | 705/36 T |
| 7,752,054 | B1 * | 7/2010 | Anthony-Hoppe et al. ... | 705/1.1 |
| 2002/0107770 | A1 * | 8/2002 | Meyer et al. ................. | 705/36 |
| 2004/0177030 | A1 * | 9/2004 | Shoham ........................ | 705/38 |
| 2005/0278245 | A1 * | 12/2005 | Celati ........................... | 705/38 |

OTHER PUBLICATIONS

Reish, Fred, "Lessons from Enron(re-visited)," Plan Sponsor, Jan. 2006, p. 80. USA, (2 pages).

Malone, Michael, "Target Date Retirement Funds: Unequivocally, the Most Important 401(k) Product Development for the Next 10 Years," MJM 401k, Mar. 23, 2006, pp. 1-3. USA.
Chang, Simon and Allen, "A Step Beyond ERISA Section 404(c): Improving on the Participant-Directed 401(k) Investment Model," Journal of Pension Benefits, Summer 2005, pp: 5-12.
Raskin, Frattini, Gropper and Hart,"Seventh Circuit Case Confirms that ERISA Section 404(c) is not the Exclusive Means to Satisfy Fiduciary Duties . . . " White & Case LLP, Jun. 2006, 4 pages.
DoI,Ebsa, Default Investment Alternatives Under Participant Directed Individual Account Plans;Final Rule, (29 CFR Part 2550), Federal Register, pp. 60452-60480. USA, Oct. 2007.
Thompson Hine, "ERISA Litigation-LaRue," Thompson Hine Publications, pp. 1-2. USA, Feb. 21, 2008.
Greenhouse, Linda, "Top Court Allows Suit Over 401(k)," The New York Times, Feb. 21, 2008, website, pp. 1-2. USA.
Francis, Theo and Mark H. Anderson, "Ruling Allows Workers to Sue on 401(k) Losses," The Wall Street Journal, Feb. 21, 2008, p. D1. USA.
Johnson, Carrie, Supreme Court Rules Employees Can Sue Over 401(k) Misconduct, Washington Post, Feb. 21, 2008, p. A01. USA.
Reish, Fred et al. "Lessons from Enron Litigation", Jul. 2005, 4 pages.

* cited by examiner

*Primary Examiner* — James Trammell
*Assistant Examiner* — Daniel L Greene

(57) ABSTRACT

A process for enrolling individual participants in compensation and employee benefit plans using performance scores from a psychometric testing instrument to determine whether individual participants understand the risks of their plan choices. As an individual's score increases on the test, a larger array of plan choices become available allowing greater opportunity for plan customization. This screening process benefits the individual plan participant by limiting plan choices where risks are not properly understood. Additionally, the use of the test as a screener to curtail unsuitable plan choices affords plan sponsors a mechanism to demonstrate that they have properly exercised their fiduciary duty.

13 Claims, 2 Drawing Sheets

USE OF PSYCHOMETRIC TESTING INSTRUMENT TO LIMIT FIDUCIARY LIABILITY

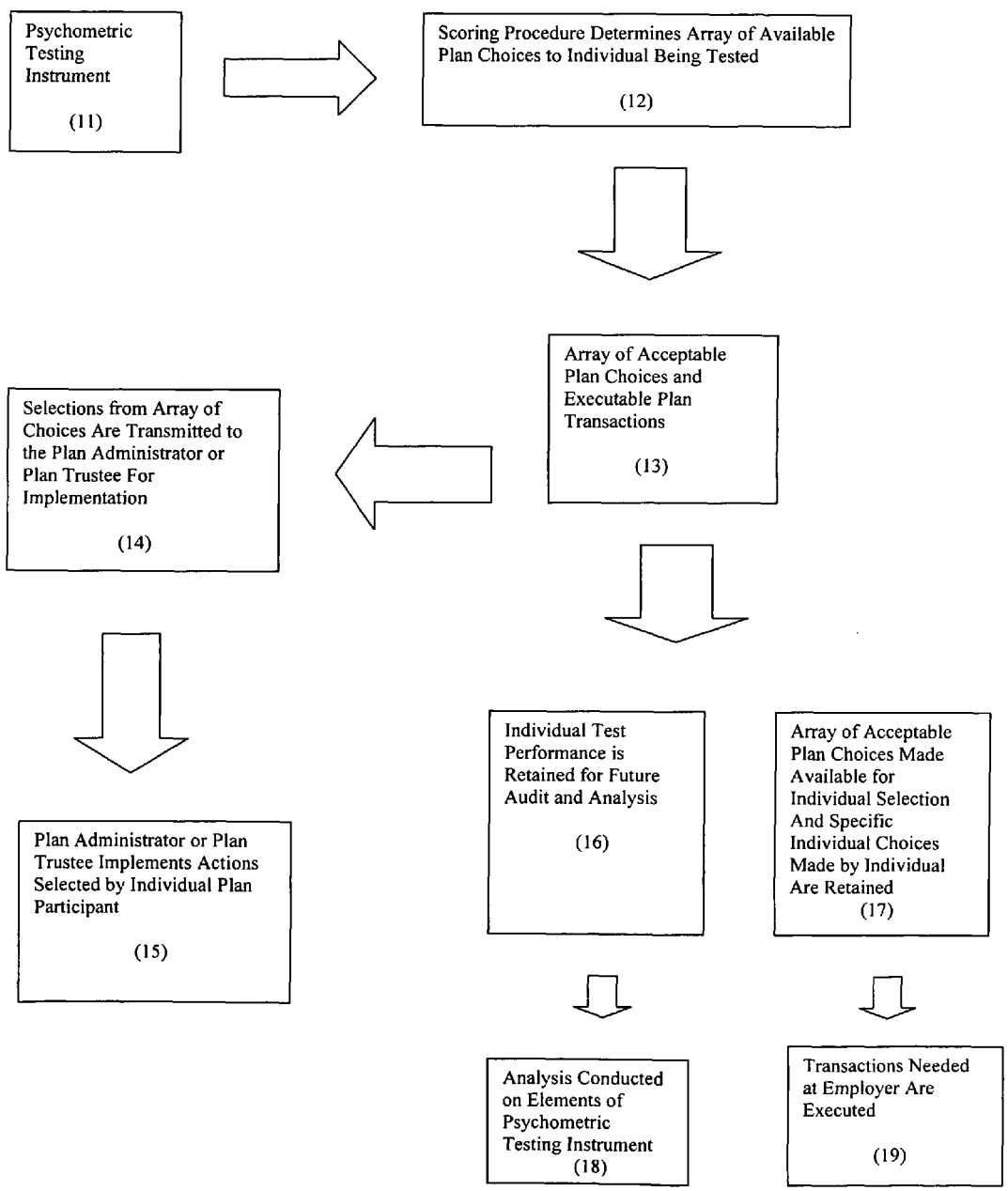

FIDUCIARY SCREENER TEST AND BENEFIT PLAN SELECTION PROCESS

CROSS-REFERENCE TO RELATED APPLICATIONS

None.

FEDERALLY SPONSORED RESEARCH

None.

SEQUENCE LISTING

None.

BACKGROUND OF THE INVENTION

1. Field of the Invention

This invention relates to the field of compensation and employee benefits and, in particular, to methods for reducing fiduciary liability for employers and plan sponsors when permitting plan participants to choose benefit options or self-direct plan investments.

2. Background of the Invention

Increasingly compensation and employee benefit plans have permitted employees to make choices and selections as to the form that their compensation and employee benefit coverage takes. This is true of health and welfare plans where such programs as flexible benefit plans under Section 125 of the Internal Revenue Code are permitted, and in the retirement planning area where employees select their own investments under self-directed defined contribution plans. In the retirement savings area, many employers have moved away from defined benefit plans to defined contribution plans. Within these defined contribution plans, many of which involve Section 401(k), Section 403(b) or Section 457(b) arrangements, employers permit employees to select their own plan investments. At the same time, the Employee Retirement Income Security Act (ERISA) of 1974 imposes fiduciary responsibilities on the employer sponsoring the plan to assure the suitability of the various investment options at inception and to continue to monitor these investment options for their suitability on an ongoing basis. (For plans not specifically subject to ERISA-imposed fiduciary liability, many of these plans will follow the precepts and legal principles established by ERISA plans as models of "best practices." This would be true of governmental plans and church plans that are exempt from ERISA-imposed fiduciary requirements. Accordingly, the invention described in this patent application would also have relevance to these non-ERISA plans as a "best practice" or under general trust law for assuring the best interests of plan participants even if a plan is not subject to ERISA under the law.)

In recent years, the extent to which an employer must exercise "due diligence" with monitoring investment suitability has been a subject of judicial review. Fiduciaries are required to act prudently in selecting and monitoring plan investments. With the transformation of the private pension system to one where employees make decisions regarding their own plan investments, other issues such as what an employer can do to facilitate investment education and who is able to provide investment advice have been undergoing major change.

The extent to which a plan sponsor must exercise "due diligence" regarding participant—directed plan investments was clarified in litigation tied to the massive bankruptcy of the Enron Corporation. The legal citation for this case is: *Enron Corporation Securities, Derivative and ERISA Litigation*, 284 F. Supp. 2d 511 (S. D. Tex. 2003). The decision by Judge Harmon, the presiding judge in the case, along with the "friend of the court" brief filed by the Department of Labor (DOL) clarified the fiduciary responsibilities of plan sponsors for participant-directed investments in an ERISA plan.

As statutorily determined under ERISA, the trustee or named fiduciaries of a plan are responsible for the investment of plan assets. [See ERISA ss405(c)] The trustee or named fiduciaries may appoint an investment manager (as defined in ERISA Section 3(38)), which will relieve the fiduciaries of responsibility for managing the investments, [see ERISA ss4 05(d)] but they must prudently select and monitor the manager. Section 404(c) of ERISA provides a procedure under which fiduciaries may be relieved of liability for losses resulting from a participant's exercise of control over his or her own account. To obtain 404(c) relief, the plan must comply with roughly 20 requirements found in the DOL regulation.

In her decision, Judge Harmon stated: "If a plan does not qualify as a 404(c) [plan], the fiduciaries retain liability for all investment decisions made, including decisions by the Plan participants." [emphasis added] This decision by Judge Harmon was aligned with the "friend of the court" brief filed by the DOL in the Enron case which stated:

The only circumstance in which ERISA relieves the fiduciary of responsibility for a participant-directed investment is when the plan qualifies as a 404(c) plan under ERISA ss404(c) . . . a fiduciary is not liable for losses to the plan resulting from the participant's selection of investments in his own account, provided that the participant exercised control over the investment and the plan met the detailed requirements of a Department of Labor regulation.

Below is cited commentary by an expert on fiduciary liability explaining the implications of this landmark judicial decision on fiduciary liability issues for employee benefit plan sponsors:

What the Enron decision emphasizes is these responsibilities apply even to investment decisions made by the participants with respect to their own accounts—unless the plan complies with the requirements of ERISA Section 404(c). This is a powerful statement, because, for participant-directed plans, it places the responsibility for the prudence of participant investment decisions on the fiduciaries. Why? Because, in our experience, few plans actually comply with the requirements for 404(c) protection. It is commonly understood that fiduciaries remain responsible for selecting the investment options in participant-directed plans. Many fiduciaries, and most advisors, also know that fiduciaries can only be relieved of responsibility for the investment of participant accounts if the participants actually exercise investment control. What has not been commonly understood is that the fiduciaries can only be relieved of liability for participant investment decisions if the plan meets the detailed requirements of the DOL's 404(c) regulations. [DOL Reg.ss2550 404(c)-1; . . . ]

Put another way, the fiduciaries remain responsible for the prudence of the participant investment decisions even though the participants make the decisions. Merely allowing participants to decide how to invest their own accounts is not enough; the fiduciaries must take steps to ensure that the plan provides a broad range of investment options, provides the participants with the opportunity to exercise control over their accounts, and provides the participants with information sufficient to enable them to make informed investment decisions. And that must be done in a way that satisfies the 20 or so specific requirements in the regulation. If these requirements are not met, the fiduciaries are charged with the responsibility for the participants' decisions. Needless to say, this strongly reinforces the importance of complying with the 404(c) requirements—and the need to provide an investment structure that supports well-invested participant accounts (such as age-based life cycle or risk-based life style funds, managed accounts, or asset allocation models). (Reish, Pp. 3-4, Lessons from the Enron Litigation)

Until the legal clarifications were made in the previously stated court case, the extent to which a plan sponsor or fiduciary possesses fiduciary liability for participant-directed plan choices was not fully understood and appreciated by most plan sponsors. Now as plan sponsors become aware of their potential liability exposure in these areas, they will look to find business methods that decrease or avoid such liability. As recommended by the expert (Reish) on fiduciary liability, several approaches are available to support the goal of an investment structure that supports well-invested participant accounts. One such approach suggested above is using an asset allocation model. Here an individual would determine an asset allocation approach that incurs the amount of risk he or she is willing to accept consistent with the risks and returns that various asset classes have exhibited historically.

Another approach would entail use of a risk-based life style fund. A risk based life style fund is a single fund or fund of funds whose asset allocation weightings are determined by how much risk an individual seeks to incur. One might select from a "conservative," "moderate," or "aggressive" allocation. Typically the "aggressive" allocation would have the largest weighting in equities. These funds free investors from having to rebalance their portfolios over time if they have selected a particular amount of risk they seek to incur. The portfolio manager would automatically rebalance the portfolio to preserve the asset allocation consistent with the risk preference initially selected.

Another approach suggested above is an age-based lifestyle fund. These types of funds are also called target date retirement funds. "Target date retirement funds are the most important 401(k) product development initiative to come along in the last ten years, and I give credit to Fidelity (Investments) for pioneering this concept with the introduction of the Freedom Funds targets in October of 1996 . . . . Target date funds are no more than any other asset allocation or a life cycle fund with two rather uncomplicated twists: (a) the fund has wisely been 'labeled' to correspond with an anticipated year of retirement, and (b) rather than keeping the allocation static, the fund's equity exposure gradually slides down a 'glide path' over time." (Malone, p.1 Mar. 23, 2006)

Yet another approach would be to use a managed account. With a managed account, an investment manager would look to manage investments consistent with pre-determined risk levels that are made known to investors. Some investment professionals have actually suggested use of a questionnaire to determine risk preference and then manage multiple accounts that would tailor investments in those specific accounts to the identified risk preferences of investors. This approach would avoid participants directing their own investments and leave the investing responsibilities with the investment manager selected by the plan sponsor. (Chang, Simon, and Allen, 2005)

Although many of the aforementioned investment structures have significant advantages, they also have certain disadvantages. A primary and significant disadvantage common to all of the aforementioned investment structures is that they curtail the ability of the individual participant to select investments that he or she expects will provide the best investment return given his or her individual risk profile. For the knowledgeable investor, the ability to self-direct one's plan investments holds significant appeal. All of these other suggested investment structures serve to limit fiduciary liability exposure for the plan sponsor, but in doing so, restrict the freedom of the individual plan participant to customize his or her benefit plan.

Following the Enron decision, another court case was decided involving a plan sponsor that did not qualify for 404(c) protection. In this decision, (*Jenkins* v. *Yager & Mid America Motorworks, Inc.*, No. 04-4258 7th Circuit, Apr. 14, 2006), it was held that ERISA section 404(c) is only a safe harbor and the actions of the plan trustee, when delegating decision-making authority to plan participants, must be evaluated to see if they violate a trustee's fiduciary duty. In *Jenkins* v. *Yager & Mid America Motorworks, Inc.*, the Court found that "Mr. Yager provided his employees with the necessary information to enable them to direct their investments in the 401(k) Plan, including by holding yearly meetings with a financial advisor to discuss investments in the 401(k) Plan." (White & Case, p. 3) The significance of the *Yager* decision is that it allows plan sponsors to prove they did not violate a trustee's fiduciary duty if they take proactive steps that are beneficial to participant decision-making. The suggested invention provides a means for a plan sponsor or fiduciary to limit fiduciary liability exposure while preserving the ability of the individual participant to customize his or her benefit plan.

Following passage of the Pension Protection Act of 2006 (PPA), enacted into law in August of 2006, the Department of Labor (DOL) issued guidance concerning default investments in participant directed individual account plans. The following background and guidance was provided:

"With the enactment of the PPA, section 404(c) of ERISA was amended to provide relief afforded by section 404 (c)(1) to fiduciaries that invest participant assets in certain types of default investment alternatives in the absence of participant investment direction. Specifically, section 624(a) of the PPA added a new section 404(c)(5) to ERISA. Section 404(c)(5)(A) of ERISA provides that, for purposes of section 404(c)(1) of ERISA, a participant in an individual account plan shall be treated as exercising control over the assets in the account with respect to the amount of contributions and earnings which, in the absence of an investment election by the participant, are invested by the plan in accordance with regulations prescribed by the Secretary of Labor. Section 624(a) of the Pension Protection Act directed that such regulations provide guidance on the appropriateness of designating default investments that include a mix of asset classes consistent with capital preservation or long-term capital appreciation, or a blend of both. In the Department's view, this statutory language provides the stated relief to fiduciaries of any participant directed individual account plan that complies with its terms and with those of the Department's regulation under section 404(c)(5) of ERISA. The relief afforded by section 404 (c)(5), therefore, is not contingent on a plan being an 'ERISA 404(c) plan' or otherwise meeting the requirements of the Department's regulations at ss 2550.404c-1. The amendments made by section 624 of the Pension Protection Act apply to plan years beginning after Dec. 31, 2006.

On Sep. 27, 2006, the Department, exercising its authority under section 505 of ERISA and consistent with section 624 of the Pension Protection Act, published a notice of proposed rulemaking in the Federal Register (71 FR 56806) that, upon adoption, would implement the provisions of ERISA section 404(c)(5)." (Federal Register (29 CFR Part 2550, p. 60452)

The final rules were published in the Federal Register on Oct. 24, 2007 and these final rules had an effective date of Dec. 24, 2007. It is not entirely certain as to the effect of these relatively recently issued final rules on default investments on the implementation and use of the invention in this patent application. It is believed by the inventor that the use of this invention may be integrated within the enrollment and ongoing monitoring functions of a plan sponsor and be compatible with the rules of default investments.

The invention described in this patent application is particularly timely. On Feb. 20, 2008, the U.S. Supreme Court decided the case of *LaRue* v. *DeWolff, Boberg& Associates, Inc.*, et al. This case clarified that individual participants in 401(k) and other retirement plans subject to ERISA have standing to sue plan fiduciaries to recover investment losses from their accounts. Previously when the Supreme Court decided the case of *Massachusetts Mutual Life Insurance Co.* v. *Russell*, it had held that individual participants could not bring an ERISA claim "to recover consequential damages," but could only seek recovery by "the plan as an entity." *LaRue* renders this prior holding irrelevant and permits a plan participant to pursue "damages" to the plan, even where measured solely by the injury to the plan participants' individual accounts (Thompson Hine, p. 1). This important case was reported in *The New York Times, Wall Street Journal*, and the *Washington Post* newspapers on Feb. 21, 2008. (New York Times, pp. 1-2, Wall Street Journal, p. D1, and Washington Post, p. A01). This precedent-setting case is likely to result in increased litigation against plan sponsors by plan participants. Accordingly, the invention described in this patent application may assist plan sponsors in avoiding such litigation.

Employees who have been defaulted into investment choices may be particularly at risk should a market downturn occur, particularly if they are not well-informed investors. If my invention is used as part of the enrollment process, it may protect less well-informed investors from fleeing beneficial long-term default investments prematurely when market corrections occur.

Currently there are various administrative record-keeping systems for processing benefits transactions. The patent to El-Kadi and Derienzo (U.S. Pat. No. 6,014,642) relates to a system for processing investment information, participant data and financial transactions with respect to employee benefits programs. Similarly, there are systems that provide for tracking and accounting of plan choices. The patent to Gilbert and Gupta (U.S. Pat. No. 6,041,313) relates generally to the field of computer-based retirement plan tracking and accounting with specific application to a modified 401(k) retirement plan. There have also been patents disclosing inventions that serve to allow investors to screen investments for appropriateness and that allow investors to assess their personal financial risk tolerance. The invention in a patent of Maggioncalda, Jones, Sharpe, Fine, and Tauber (U.S. Pat. No. 5,918,217) allows a user to explore how changes in risk tolerance, savings level and retirement age affect the probability of achieving one's financial goal. The patent of Davey (U.S. Pat. No. 6,859,788) discloses a method and system for the automated assessment of personal financial risk tolerance. The patent of Rebane (U.S. Pat. No. 6,078,904) discloses a system for optimally allocating investment funds of an investor in a portfolio having a plurality of investments.

The field of psychometrics has produced various types of testing instruments to ascertain measures of knowledge, aptitudes and proficiency. The patent of Penno (U.S. Pat. No. 6,705,870) discloses one such example. Some of these methods involve computer-implemented methods such as the method disclosed in the patent of Calhoun, Peterson and Merzenich (U.S. Pat. No. 6,565,359) which relates to a computer-implemented method and apparatus for remote cognitive and/or perceptual testing. Some of these methods and apparatuses provide a means of training as well as testing. The patent of Breznitz (U.S. Pat. No. 6,632,174) discloses a method for testing and/or training cognitive ability. Some of these testing and training instruments involve a simulation or case study. The invention in a patent of Gray and Coons (U.S. Pat. No. 6,944,596) makes use of an education business simulation. Some testing and training approaches make use of a technique known as adaptive testing. The invention in a patent of Moore, Cleveland, Vulfs, Carter, Cahill, and Heinz (U.S. Pat. No. 6,925,601) uses an adaptive testing tool. Once any type of cognitive or psychological test is administered, there usually is a method to record and retain performance. The patent of Poreh (U.S. Pat. No. 6,629,846) discloses a method for recording performance in psychological tests.

Although various types of psychometric testing instruments exist, they have not been used in conjunction with compensation and benefit plan enrollment systems to determine whether plan participants possess sufficient knowledge or capability to make certain plan choices. In accordance with my invention, using a measure of performance on a psychometric testing instrument to determine an array of either recommended plan selections or allowable choices under a plan protects plan participants and their beneficiaries. My inventive method also allows plan sponsors to limit fiduciary liability and proactively fulfill their fiduciary responsibilities.

SUMMARY

In accordance with my invention, a psychometric test paired with an employee benefit or compensation program that determines understanding of various compensation or benefit plan options, serves to measure acceptable knowledge and competence to make plan selections and then as one possible intervention limits access to plan options based on the test outcome. Inability to demonstrate certain levels of mastery results in an individual having to re-test, engage in certain education or training before re-testing, obtaining proof of competent assistance in making plan choices, or being defaulted into an option with a lower level of overall risk. Demonstration of greater proficiency on the test permits a wider array of employee choice that presumably carries potential for greater rewards while at the same time possessing greater levels of risk. Access to a wider array of employee choice allows for greater individual customization to tailor the program to the individual's risk profile and desired investment or unique plan coverage requirements. As an alternative to actually limiting plan options, a plan sponsor may merely recommend that a plan participant restrict their choices to a universe of plan choices aligned with the participant's capability as demonstrated by test performance.

Accordingly several advantages of the invention accrue to both plan participants and plan sponsors. In a preferred embodiment of the invention, plan participants are denied access to plan features where they lack sufficient knowledge of the option or its related risks. In that way, the invention serves to limit unforeseen risk to plan participants. For the plan sponsor, the use of this invention provides an added safeguard for its employee that restricts plan participant access to features the employee fails to understand and which may be inappropriate plan choices for said individual. Use of the invention also serves to limit fiduciary liability for the plan sponsor potentially resulting in lowered legal costs and avoidance of fiduciary claims and direct legal fees associated with litigating such claims. Use of the invention also may reduce premium costs associated with fiduciary insurance provided by insurers. In addition to the advantages of the invention for the plan participants and plan sponsors, the invention provides a plan feature that holds value for insurance companies that provide insurance for fiduciary claims. Presumably this mechanism and screening process reduces the prevalence of fiduciary claims. Finally, the invention furthers the public policy objective of protecting the assets and avoiding undue risk for plan participants and beneficiaries covered by both ERISA and non-ERISA benefit plans.

BRIEF DESCRIPTION OF THE DRAWINGS

FIG. 1 shows two broad approaches plan sponsors may use. Plan sponsors may either use the testing instrument to recommend a universe of investments a plan participant should select within, or the plan sponsor may take a more restrictive "gatekeeper approach" and actually restrict the universe of available investments based on an individual participant's performance on the psychometric testing instrument.

FIG. 2 is a flowchart showing how the method for compensation or benefit plan selections and transactions occurs in accordance with my invention when the performance on a psychometric testing instrument is used to actually limit the array of acceptable plan choices and executable plan transactions made available to the individual participant.

DETAILED DESCRIPTION

Preferred Embodiment

Figure 1:
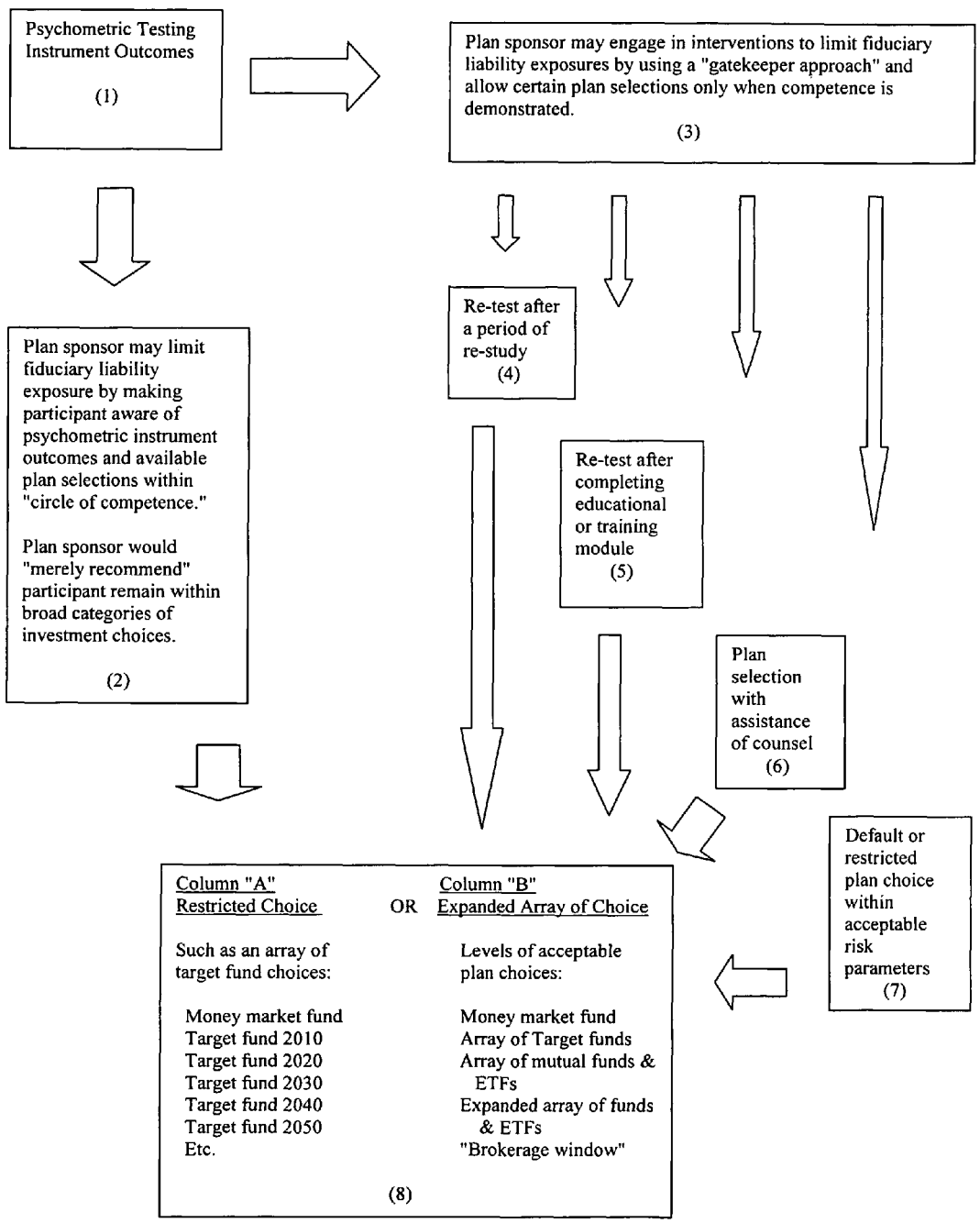
FIG. 1 is a macro-level diagram illustrating potential plan sponsor approaches to reduce or eliminate fiduciary liability exposure by using a psychometric testing instrument in accordance with my invention.

FIG. 1: Use of Psychometric Testing Instrument to Limit Fiduciary Liability

FIG. 1 is a flowchart depicting alternative actions that a plan sponsor may take in an attempt to limit fiduciary liability. Following the reporting of participant performance on the psychometric testing instrument at position 1, the plan sponsor may either recommend a universe of acceptable investments moving to position 2 or use the more restrictive approach of actually limiting participant choices by moving to position 3. (Alternatively, a hybrid approach also may be used where an employer makes recommendations as noted at position 2, but uses a more restrictive policy as indicated at position 3 if scores on the psychometric test are below a certain level.)

Position 2: "Merely Recommending" Broad Categories of Investment Choices:

In keeping with the path of position 2, a plan sponsor may recommend that a participant choose between a money market fund or a menu of target retirement funds (Column A at position 8). A plan sponsor may choose to offer the menu of default investments specifically identified as acceptable default investments in the guidance promulgated by the Department of Labor, *Default Investment Alternatives under Participant Directed Individual Account Plans*, 29 CFR Part 2550. Alternatively, a plan sponsor may indicate that the participant has demonstrated an understanding of a more expanded array of investment choices (Column B at position 8). It is important to realize that these are not investment recommendations or investment advice, but counsel on demonstrated knowledge of investments. The plan sponsor is merely suggesting that the individual not move beyond the boundaries of his or her "circle of competence" if the test is providing evidence that the participant does not understand benefit plan options or the risks that accompany these choices.

Position 3: A "Gatekeeper Approach" where Choices are Limited Unless Competence is Demonstrated:

Following the more restrictive path of position 3, a plan sponsor requires demonstrated competence in order to make certain plan selections. If a plan sponsor implements a policy whereby demonstrated competency is required to access various plan choices, other policy decisions are required to determine whether the individual participant may use alternate paths to demonstrate competency. For instance, if a plan participant does not achieve a score that would allow access to the expanded array of benefit choices (Column B at position 8), he or she may be permitted to re-test after a period of re-study as indicated at position 4. Another alternative is to allow for re-testing after completion of an educational or testing module (position 5). Another alternative is to require plan selection with the assistance of counsel (position 6). Another alternative shown at position 7 is to immediately default the plan participant after one testing attempt into a certain benefit choice or alternatively to allow choice within a limited array of plan options (Column A at position 8) whose risk level is commensurate with the knowledge or ability demonstrated via test performance.

FIG. 2: Method to Align Plan Selection Choices with Demonstrated Competency

FIG. 2 is a flowchart of a process that occurs when the psychometric test either defaults participants into various plan choices or provides an array of limited plan choice. In FIG. 2 this business process begins with administration of the psychometric testing instrument to the plan participant occurring initially at position 11 before any compensation or benefit plan selections are chosen. Once the psychometric test is administered, the test undergoes a procedure where scoring occurs at position 12. Not only is a score computed for the psychometric test, but the level of the score then determines at position 13 the array of possible compensation and benefit plan choices for the individual participant to choose from. Lower scores on the psychometric test result in fewer and less risky plan choices. Higher scores allow for an expanded array of choices where plan participants may customize their program to a greater extent and assume greater risk while pursuing greater rewards. In a particular preferred embodiment of my invention the choice is either a full array allowing maximum choice or the defaulted choice depending upon whether or not the plan participant passes the psychometric test. In this particular embodiment of my invention, essentially with a "Pass-Fail" measure on the psychometric test, there is either "Choice or No Choice" in the selection of investments or benefit plan alternatives.

Once compensation and benefit plan selections are made, these choices are transmitted to the plan administrator or plan trustee at position 14 for implementation at position 15. Also, when the individual plan participant takes the test, his or her individual test performance is retained at position 16 for future audit and analysis at position 18. The employer also may retain the test-determined permissible plan choices for the individual participant and his or her specific selections at position 17 to process any business transactions internal to the employer at position 19. These internally processed business transactions at the employer may be such things as payroll deductions. If payroll processing is out-sourced to a third-party administrator, this information may be communicated to the third party.

REFERENCE NUMERALS

FIG. 1 Reference Numerals:
01 psychometric testing instrument administered and outcomes received by plan Administrator
02 plan sponsor uses test performance to recommend universe of investments
03 plan sponsor uses test performance to align plan choices with demonstrated competence
04 alternative of re-test after a period of re-study
05 alternative of re-test after completing educational or training module
06 alternative of plan selection with assistance of counsel
07 alternative of default or restricted plan choice within acceptable risk parameters
08 array of restricted choice and expanded choice plan alternatives FIG. 2 Reference Numerals:
11 psychometric testing instrument administered to individual plan participant
12 scoring procedure which determines array of plan choices presented to individual participant
13 array of plan choices and executable plan transactions presented to individual plan participant
14 selections of plan choices and array of transactions sent to plan administrator or plan trustee post individual choice
15 executed transactions implemented by plan administrator or plan trustee
16 individual test results retained for future audit and analysis
17 array of acceptable plan choices presented to plan participant and individual selections made by plan participant
18 information (i.e., group statistics) is aggregated on psychometric testing instrument so analysis on instrument can be conducted
19 transactions needed at employer, such as withholdings from payroll, are executed by the employer Operation Preferred Embodiment In operation, a plan participant takes the psychometric test at hire or prior to entry into the plan, annually, or at predetermined regular time intervals to determine ongoing knowledge and competence, or when certain plan changes are initiated. Alternatively, the plan sponsor may run periodic reviews of plan choices and request demonstration of competency should individual plan choices indicate an undue risk profile or plan selections that are inconsistent. Upon completion of the test, knowledge and competencies are assessed and scored. At this juncture a plan sponsor may either recommend that an individual participant remain within a certain universe of choices, or use a gatekeeper approach where only certain choices are offered. Either an overall score or selected sub-scores in relevant competency or content areas may be used to identify the acceptable array of plan choices. Depending upon plan sponsor requirements and the advice of the plan sponsor's legal counsel, various alternative options may be presented to the plan participant. These possible options may include, but not necessarily be limited to, the following:

1. Re-test after a period of re-study.
2. Re-test after completing a specially designed educational or training module.
3. Provide a signed affidavit that outside counsel is being used to assist the plan participant in selection of an acceptable and appropriate plan option.
4. Default the plan participant into a plan option whose balanced characteristics mitigate risk or offer several risk-restricted choices.

An example of the operation of the psychometric test when paired with a profit sharing, 403(b) plan or 401(k) plan, may take the following form:
Psychometric Test Administered:
    1.) At hire or
    2.) Prior to the first date of initial eligibility to participate in the plan, and
    3.) Subsequently annually one month prior to the start of the plan year.

Upon outcome of test, the test administrator forwards acceptable plan options to the plan participant who makes selections from available plan choices. These choices may include the following options:
    1.) A money market account
    2.) An array of age-related balanced lifestyle funds, and the option shown in 1.) above
    3.) An expanded array of mutual funds and exchange traded funds meeting minimal 404(c) investment choice requirements, plus options shown in 1.) and 2.) above
    4.) A more expanded array of mutual funds and exchange traded funds, inclusive of the options shown in 1.), 2.) and 3.) above, but adding even more options involving choices with greater historical risk and price volatility measures
    5.) Option 4.) above, but with a brokerage window option offered where the plan participant may select individual stocks, bonds, commodities, options, etc.

As is evident from the previously described array of investment options, greater investment knowledge and sophistication is expected if the individual seeks to engage in investment strategies allowed in those options ascending to option 5.).

Rules for Sample 401(k) Plan Choices:
    Those who have failed to enroll in the plan by signing an application and who are subject to automatic enrollment in the plan may be defaulted into a selected option, such as Options 1, 2, or 3.
    Those not achieving a minimal score for knowledge of investment options or portfolio construction may be restricted to either Options 1, 2, or 3.
    Those achieving higher scores may choose the alternatives permitted in Options 1, 2, 3 and 4.
    Those demonstrating achievement of the highest levels of knowledge and competency on the test may be permitted to select Options 1, 2, 3, 4, or 5.
    Alternatively, plan rules may offer multiple plan options, but require certain threshold weightings within various asset classes. A variety of portfolio construction approaches may be possible. The key element in these various approaches is that the plan sponsor restricts the individual plan participant to investment choices that limit risk to an acceptable level determined by the plan sponsor. Greater risk and the potential for greater reward under a more customized program is only permitted when the plan participant provides evidence of knowledge and competency via improved performance on the testing instrument or seeks counsel from professional advisors.

Description

Alternative Embodiment

Although the preferred embodiment of this invention describes a method that may be implemented by a single plan sponsor, a more universal approach is also possible. A psychometric test may be used for testing knowledge and aptitudes concerning commonly offered compensation and employee benefit plan features or offerings. This more universal test or series of tests may be administered to workers at any time. For instance, the test may be administered to college and graduate students before they enter the workforce. Test results from this more universal test may be used by employers to reduce fiduciary liability as done in the preferred embodiment of the invention described above. Accordingly, those results may be utilized to make recommendations concerning plan choices or to select the array of possible plan choices offered to the participant. This more general approach may become popular if the practice of administering a psychometric test when selecting plan choices becomes more widely used in practice once introduced.

Operation

Alternative Embodiment

Under the more universal embodiment described in the immediately preceding section, a plan sponsor may rely on a plan trustee, such as a mutual fund company, to administer a more universal test to its many clients concerning investment knowledge. These scores may then be used to make recommendations or to offer options under the sponsors' plans that are consistent with the test scores of the individual participants. An advantage of this approach is that a much larger pool of more frequent test takers creates an ongoing process where test questions may be tailored to recent environmental occurrences. A larger pool of test takers created by this embodiment also provides more statistical data on the specific test questions and the opportunity to develop and substitute more questions more frequently enhancing the overall relevancy and quality of the psychometric testing instrument. This more universal approach provides the advantages of added efficiencies and lowered costs in enhancing participant knowledge and lowering plan sponsor fiduciary liability.

What is claimed is:

1. A computer implemented method of limiting a plan sponsor's fiduciary liability exposure comprising:
   administering a psychometric test to a plan participant via a display and input device to determine understanding of potential risks and rewards of plan choices under an ERISA or non-ERISA plan offered by the plan sponsor;
   scoring the psychometric test to obtain a test score;
   mapping the test score to plan choices involving acceptable levels of risk and reward, based upon knowledge and capabilities demonstrated by the test;
   creating an array of plan choices based upon the plan participant's level of measured knowledge and/or capabilities demonstrated by the test;
   allowing intervention or action as a result of the psychometric test score;
   limiting plan sponsor fiduciary liability by
      displaying and allowing the participant to select a plan choice within those choices determined to be acceptable or
      defaulting the participant into a plan choice; and
   executing via the computer, business transactions to make plan selections consistent with those options permissible based upon said test score and said plan participant selection.

2. The computer implemented method of claim 1, wherein the psychometric test includes test questions containing objective content material relevant to compensation and benefit plan decision-making.

3. The computer implemented method of claim 1, further including creating an array of compensation or benefit plan choices, wherein aggregation of plan choices is grouped by level of equivalent and/or similar risk characteristics.

4. The computer implemented method of claim 1, wherein performance on content areas in the psychometric test is used to provide an array of recommended or allowable plan choices.

5. The computer implemented method of claim 1, the engaging step comprising recommending that the plan participant only choose within a certain universe of risk-restricting choices.

6. The computer implemented method of claim 1, the engaging step comprising limiting the array of choices to select from depending on the test score achieved by the plan participant.

7. A computer implemented method of screening participant selections under a compensation or employee benefit program comprising:
   administering a psychometric test to a plan participant via a display and input device to determine understanding of potential risks and rewards of plan choices under an ERISA or non-ERISA plan offered by the plan sponsor;
   scoring the psychometric test to obtain a test score;
   mapping the test score to plan choices involving acceptable levels of risk and reward, based upon knowledge and capabilities demonstrated by the test;
   screening participant selections of plan choices based upon the plan participant's level of measured knowledge and/or capabilities demonstrated by the test;
   allowing intervention or action as a result of the psychometric test score; displaying and allowing the participant to select a plan choice from within those choices determined to be acceptable, or
   defaulting the participant into a plan choice;
   executing via the computer, business transactions to make plan selections consistent with those options permissible based upon said test score and said plan participant selection,
   whereby a plan sponsor can provide at least the test score as evidence of participant knowledge and capability to engage in said plan choice.

8. The computer implemented method of claim 7, wherein the psychometric test includes test questions containing objective content material relevant to compensation and benefit plan decision-making.

9. The computer implemented method of claim 7, further including creating an array of compensation or benefit plan choices, wherein aggregation of plan choices is grouped by level of equivalent and/or similar risk characteristics.

10. The computer implemented method of claim 7, wherein performance on content areas in the psychometric test is used to provide an array of recommended or allowable plan choices.

11. The computer implemented method of claim 7, the engaging step comprising recommending that the plan participant only choose within a certain universe of risk-restricting choices.

12. The computer implemented method of claim 7, the engaging step comprising limiting the array of choices to select from depending on the test score achieved by the plan participant.

13. A computer implemented method of limiting plan sponsor fiduciary liability exposure comprising:
  using an input and display device to administer a test to and obtain answers from a plan participant on potential risk and reward choices associated with a compensation arrangement or employee benefit plan; and
  limiting plan sponsor fiduciary liability exposure by displaying and allowing selection of only plan choices determined to be understood by the plan participant based upon the answers to the test, or responsibly chosen with documentable advice provided by a competent advisor.

* * * * *